US012626346B2

(12) United States Patent
deNijs et al.

(10) Patent No.: US 12,626,346 B2
(45) Date of Patent: May 12, 2026

(54) TESTING OF WELD JOINTS

(71) Applicants: Eric deNijs, Toronto (CA); Pavlo Penner, Brampton (CA); Patrick Henri, Ajax (CA); Jeff Demelo, Oro Station (CA); Mark Bonello, Brampton (CA)

(72) Inventors: Eric deNijs, Toronto (CA); Pavlo Penner, Brampton (CA); Patrick Henri, Ajax (CA); Jeff Demelo, Oro Station (CA); Mark Bonello, Brampton (CA)

(73) Assignee: MAGNA INTERNATIONAL INC., Aurora (CA)

( * ) Notice: Subject to any disclaimer, the term of this patent is extended or adjusted under 35 U.S.C. 154(b) by 322 days.

(21) Appl. No.: 18/031,974

(22) PCT Filed: Oct. 18, 2021

(86) PCT No.: PCT/CA2021/051461
§ 371 (c)(1),
(2) Date: Apr. 14, 2023

(87) PCT Pub. No.: WO2022/077124
PCT Pub. Date: Apr. 21, 2022

(65) Prior Publication Data
US 2023/0386008 A1        Nov. 30, 2023

Related U.S. Application Data

(60) Provisional application No. 63/092,678, filed on Oct. 16, 2020.

(51) Int. Cl.
*B23C 3/12*        (2006.01)
*G06T 7/00*        (2017.01)

(52) U.S. Cl.
CPC .............. *G06T 7/0004* (2013.01); *B23C 3/12* (2013.01); *G06T 2207/30152* (2013.01)

(58) Field of Classification Search
CPC ......... G06T 7/0004; G06T 2207/30152; B23C 3/12; B23C 3/00; G01N 1/286;
(Continued)

(56) References Cited

U.S. PATENT DOCUMENTS 2,499,577 A * 3/1950 Fine .......................... G01N 1/04
73/104
9,501,821 B2 11/2016 Pfitzner et al.
(Continued)

FOREIGN PATENT DOCUMENTS

CN          106170678 A        11/2016
JP          2008111751 A        5/2008
(Continued)

OTHER PUBLICATIONS

Search Report regarding corresponding CN App. No. 202180070305. 8; issued Nov. 28, 2025.
(Continued)

*Primary Examiner* — Sheela C Chawan
(74) *Attorney, Agent, or Firm* — DICKINSON WRIGHT PLLC

(57)        ABSTRACT

A method of testing a weld joint includes: preparing a part that includes at least one weld joint which joins at least two metal components with one another; machining at least one hole in the at least one weld joint; inserting, into the at least one port hole, a probe that includes a mirror attached to a camera; and reflecting an image of the weld joint off of the minor and to the camera while the probe is inserted into the at least one port hole. A method of analyzing a weld joint includes: machining a port hole in the weld joint; etching the weld joint; inserting a probe into the port hole, the probe
(Continued)

VISUAL INSPECTION — 800

1. MACHINING OF PORT HOLES (AUTOMATED) ROBOT OR CNC — 802

2. GRINDING, POLISHING (AUTOMATED) — 804

3. ETCHING (MANUAL) — 806

4. IMAGE TAKING (MANUAL) — 808

MICROGRAPH MEASURE — 810

REPORT — 812 including a minor; reflecting an image of the weld joint off of the mirror towards a camera; capturing the image with the camera; and analyzing the weld joint using the image captured by the camera.

20 Claims, 7 Drawing Sheets

(58) Field of Classification Search
   CPC ............. G01N 1/32; G01N 2021/9542; G01N 2201/0221; G01N 2203/0296; G01N 21/954; B23K 31/125; G02B 23/24
   USPC .................................................. 382/141, 100
   See application file for complete search history.

(56) References Cited

U.S. PATENT DOCUMENTS

| | | | | |
|---|---|---|---|---|
| 2018/0001422 A1 * | 1/2018 | Rajagopalan | ........ | B23K 26/282 |
| 2018/0147647 A1 | 5/2018 | Wang et al. | | |

FOREIGN PATENT DOCUMENTS

| | | | |
|---|---|---|---|
| JP | 4182589 | B2 | 11/2008 |
| JP | 2010002459 | A | 1/2010 |
| SU | 1310704 | A1 * | 5/1987 |
| WO | 2020000083 | A1 | 1/2020 |

OTHER PUBLICATIONS

Chen, Weichiat, et al., "CO2 laser welding of galvanized steel sheets using vent holes," Materials and Design, vol. 30, May 15, 2008; p. 245-251.

* cited by examiner

TESTING OF WELD JOINTS

CROSS REFERENCE TO RELATED APPLICATIONS

This U.S. National Stage Patent Application claims the benefit of PCT International Patent Application Serial No. PCT/CA2021/051461 filed Oct. 18, 2021 entitled "TESTING OF WELD JOINTS" which claims the benefit of and priority to U.S. Provisional Patent Application Ser. No. 63/092,678, filed Oct. 16, 2020, titled "Testing Of Weld Joints," the entire disclosures of which are hereby incorporated by reference.

BACKGROUND OF THE INVENTION

1. Field of the Invention

The present invention is related generally to a process of testing weld joints.

2. Related Art

When manufacturing large volumes of automotive parts, it is often necessary to periodically conduct destructive testing of weld joints to ensure that those weld joints meet strength and durability requirements. One known process of testing weld joints involves plasma cutting the welded product into smaller pieces then abrasive saw cutting each weld joint and extracting a coupon of the weld joint and analyzing that coupon in a laboratory setting. This process can be very resource and time consuming. For example, it may take multiple days from the time the coupon is cut out of the weld joint until the analysis of the coupon is completed. Such a long turn-around time can may require the part manufacturer to store multiple days' worth of inventory until the verification is completed before shipping it to a customer.

There is a continuing need for an improved weld verification process which is less time and labor consuming.

SUMMARY OF THE INVENTION

The present disclosure provides a method of testing a weld joint. The method includes: preparing a part that includes at least one weld joint which joins at least two metal components with one another; machining at least one hole in the at least one weld joint; inserting, into the at least one port hole, a probe that includes a mirror attached to a camera; and reflecting an image of the weld joint off of the mirror and to the camera while the probe is inserted into the at least one port hole.

The present disclosure provides a method of analyzing a weld joint. The method includes: machining a port hole in the weld joint; etching the weld joint; inserting a probe into the port hole, the probe including a mirror; reflecting an image of the weld joint off of the mirror and towards a camera; capturing the image with the camera; and analyzing the weld joint using the image captured by the camera.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
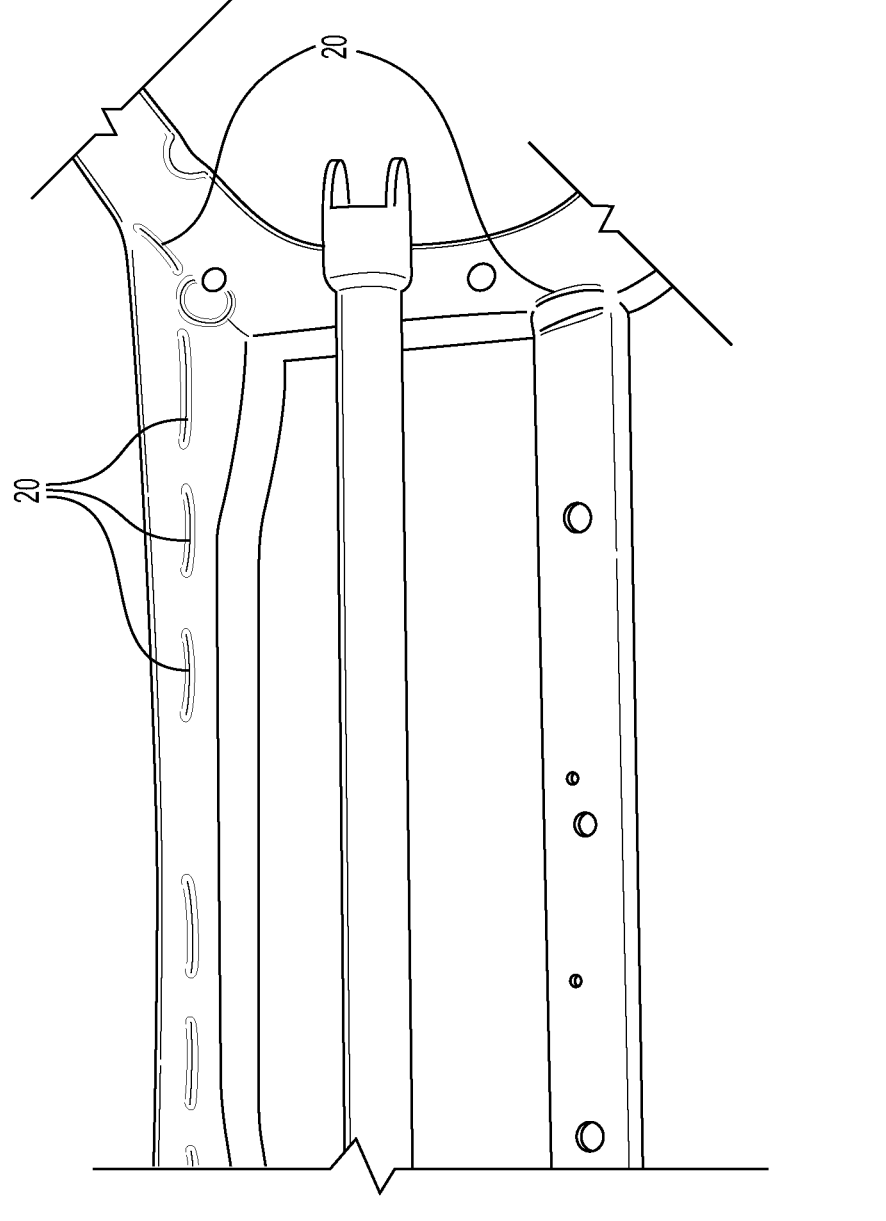
FIG. 1 is a top elevation view of an exemplary embodiment of a vehicle subframe that includes a plurality of weld joints.
Figure 1:
Figure 3:
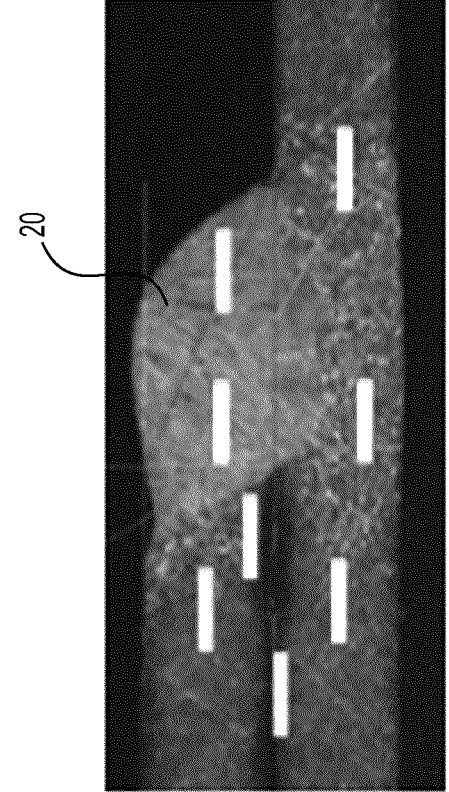
FIG. 3 is an image taken of a cross-section of one of the weld joints of the subframe of FIG. 1.
Figure 2:
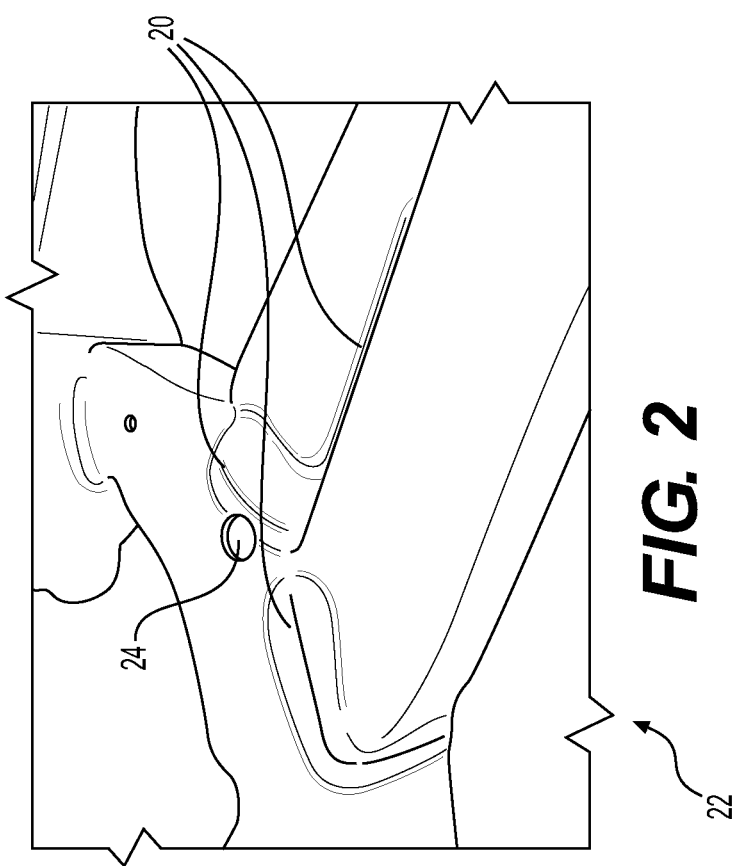
FIG. 2 is an enlarged view of a portion of the subframe of FIG. 1.

Referring to the Figures, wherein like numerals indicate corresponding parts throughout the several views, the present invention is related generally to the inspection of weld joints 20 such as the weld joints 20 on the vehicle subframe 22 shown in FIG. 1. While the exemplary embodiment shows a vehicle subframe 22, the part with the weld joints 20 to be analyzed could be a wide range of different automotive or non-automotive components and may be made of any suitable type of material for example, various steels, alloy steels, aluminum alloys, etc.). The weld joints 22 may be formed through any suitable type of welding operation (for example, gas metal arc welding [GMAW or MIG], tungsten inert gas [TIG] welding, laser welding, etc.). The part may also have any suitable number of weld joints 20 to be analyzed.

Figure 9:
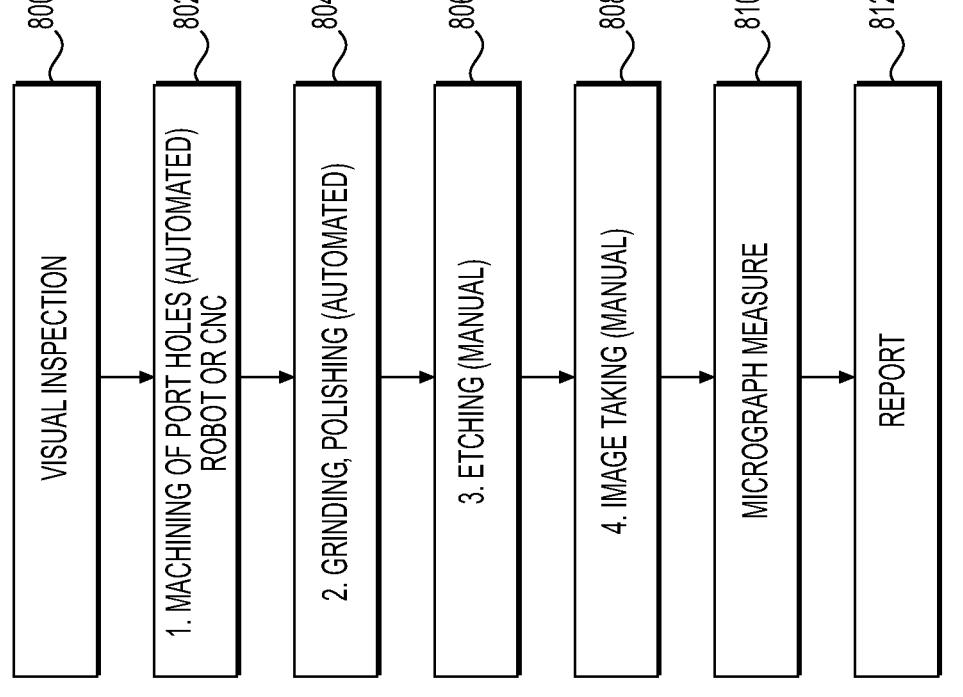
FIG. 9 is a flow chart illustrating the steps of an exemplary embodiment of a process for analyzing a weld joint.

FIG. 9 is a flow chart depicting the steps of an example method of analyzing a weld joint 20, such as any one or more of the weld joints 20 found on the subframe 22 shown in FIGS. 1-8. At step 800, a visual inspection is conducted on the weld joint 20 to look for visible problems with the weld joint 20. The visual inspection may be performed either automatically using a camera or some other imaging device or it may be performed manually.

Figure 4:
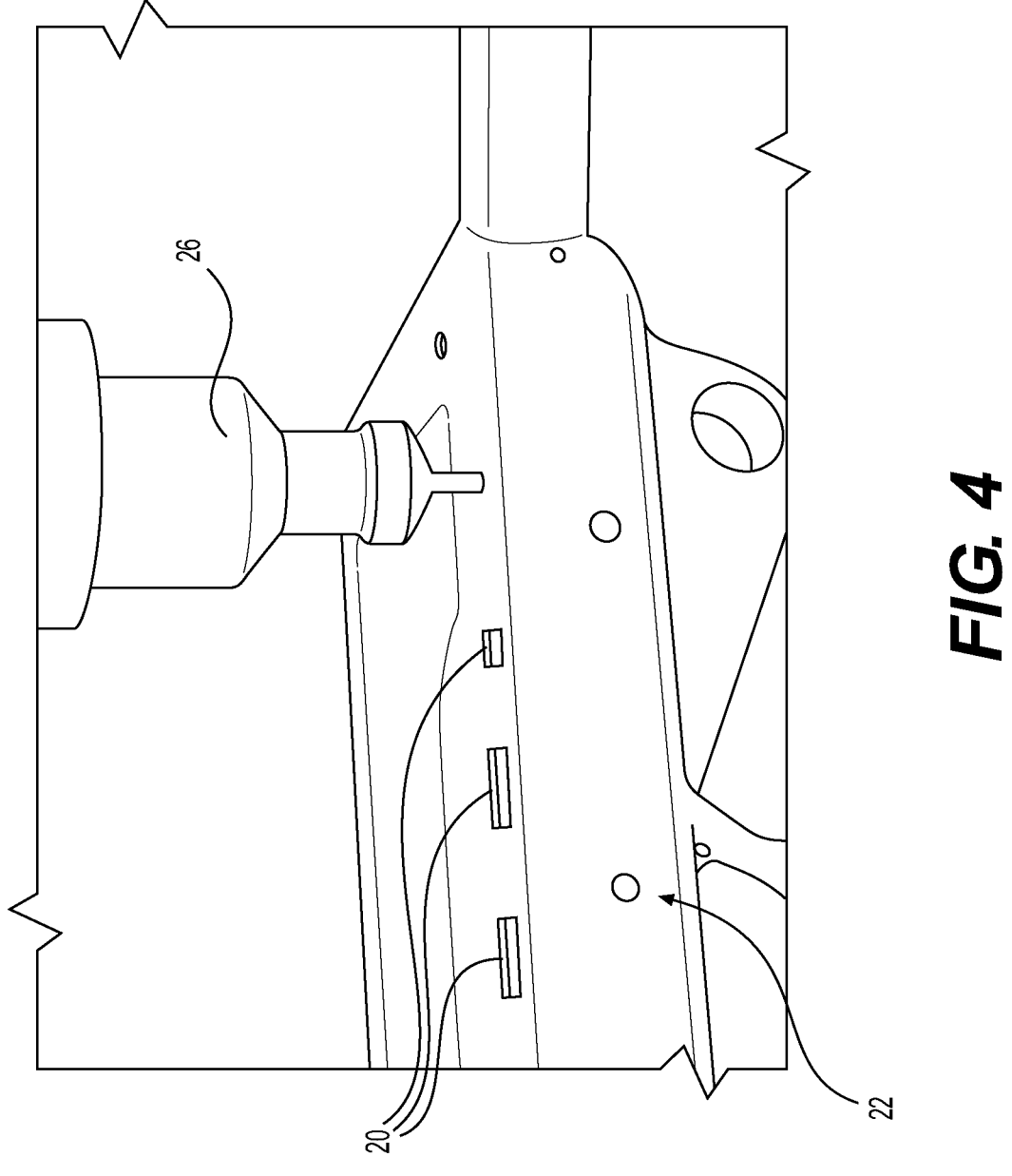
FIG. 4 illustrates a CNC milling machine forming a plurality of port holes into the subframe of FIG. 1.
Figure 5:
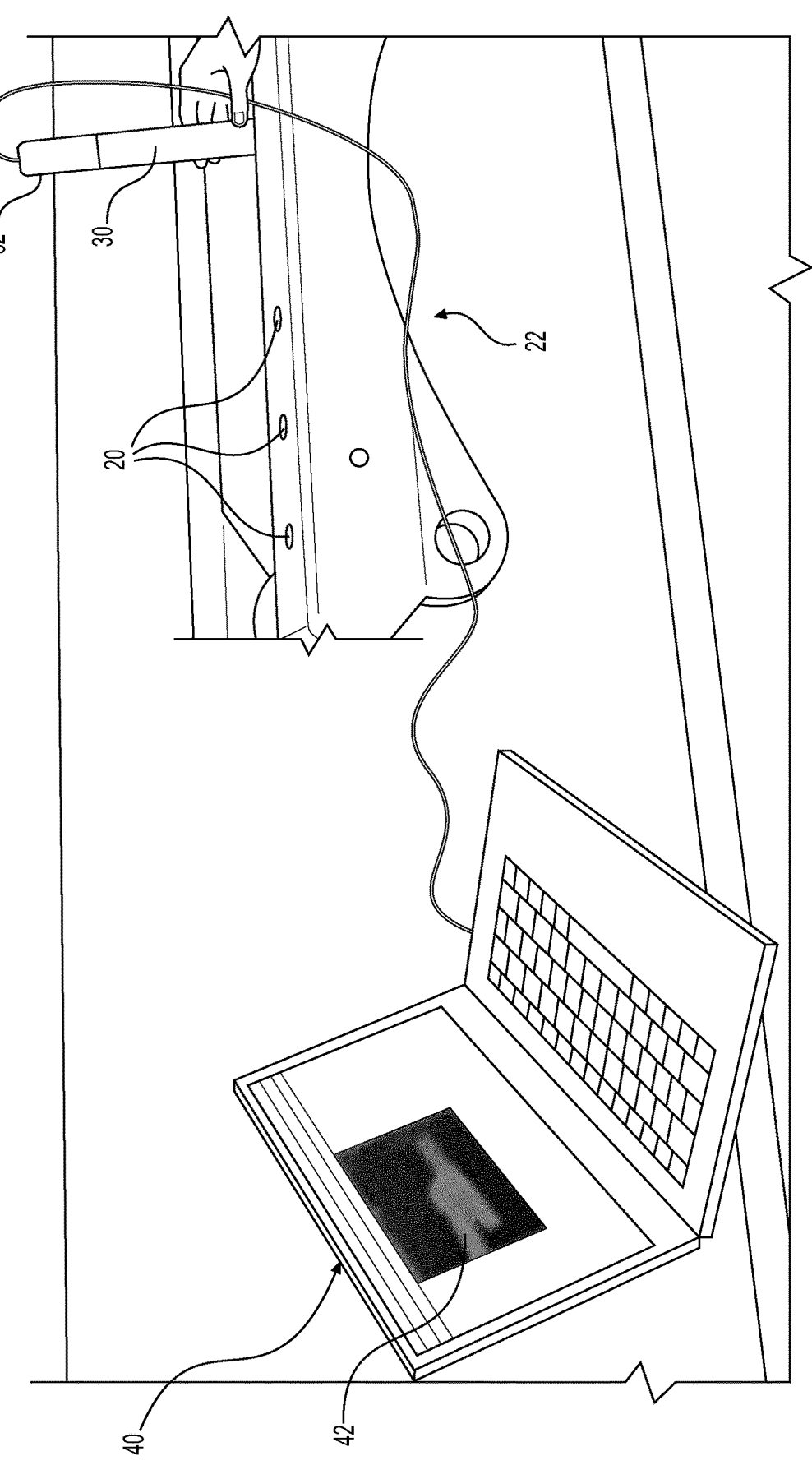
FIG. 5 shows a portable microscope being used to capture one or more images of one of the weld joints through a port hole formed into the subframe of FIG. 1.
Figures 6, 7:
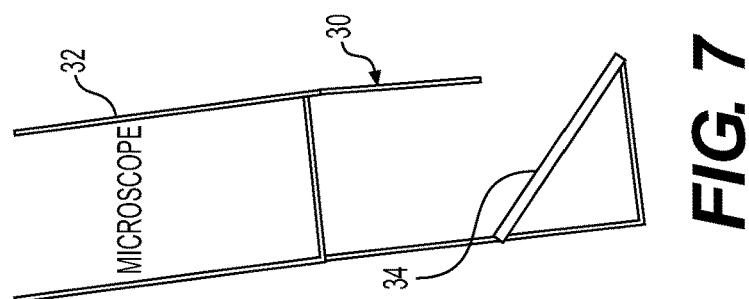
FIG. 6 also shows the portable microscope being used to capture images of a weld joint and also schematically illustrates the structure of a probe that is fixedly attached with the portable microscope.
FIG. 7 shows a cross-sectional diagram of the portable microscope.
Figure 8:
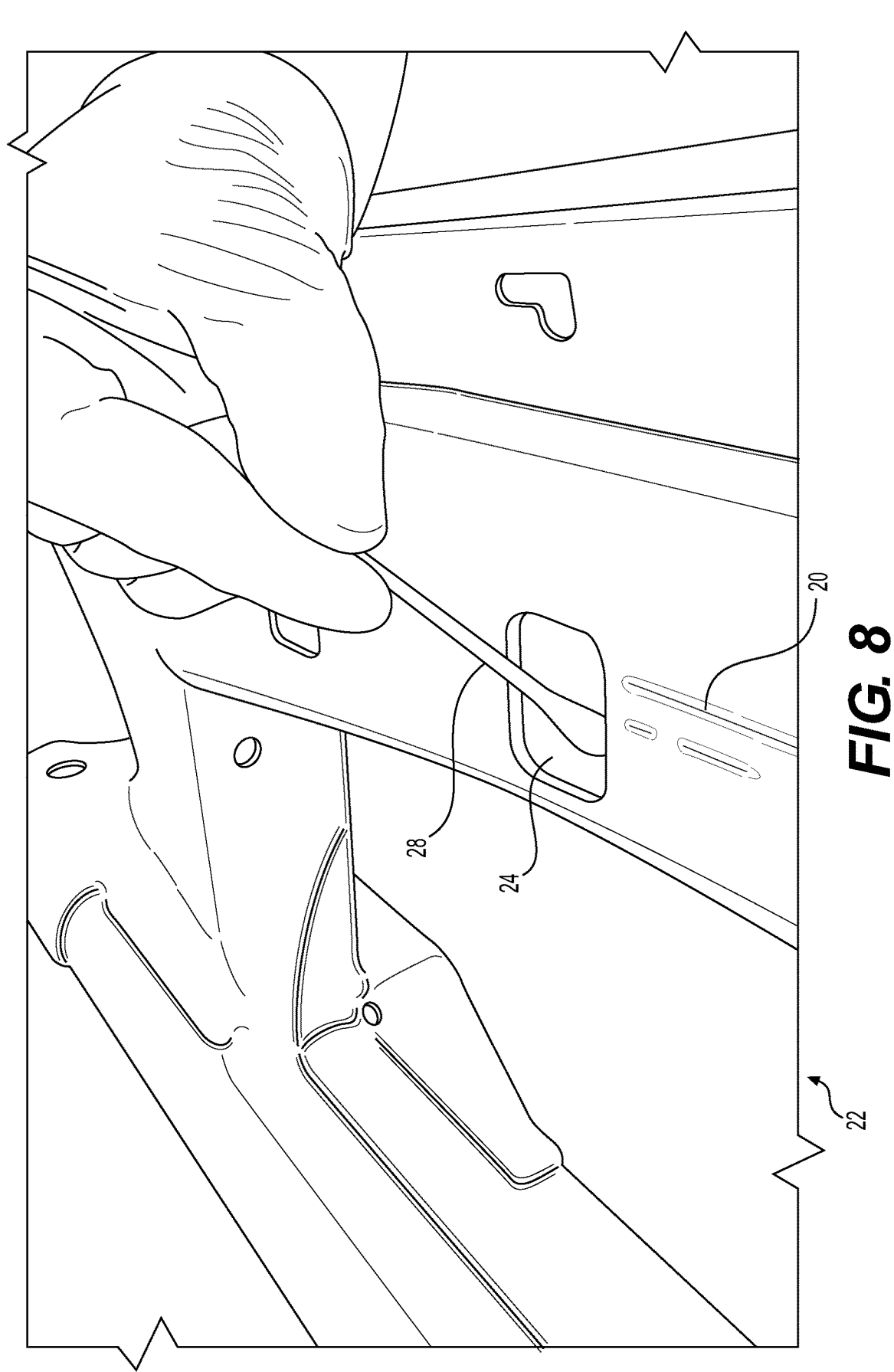
FIG. 8 illustrates an etching operation being conducted on one of the port holes of the subframe of FIG. 1.

At step 802, a plurality of port holes 24 are automatically machined into at least the part using an automated machining means, such as the computer numerical control (CNC) milling machine 26 shown in FIG. 4. The CNC milling machine 26 is pre-programmed to automatically machine the port holes 24 at specific locations that correspond with the weld joints 20 to be analyzed. Each port hole 24 extends all the way through the respective weld joint 20 so that the full thickness of the weld joint 20 can be analyzed. In the exemplary embodiment, each port hole 24 is generally square in shape and measures approximately 25 mm×25 mm. After each port hole 24 is formed into the weld joint 20, a tool on the CNC milling machine 26 is changed, and the CNC milling machine 26 makes a final finishing pass at a slow speed than what was used to initially form the port hole 24. This finishing process improves a surface finish of an inner surface of the port hole 24.

At step 804, the inner surface of the port hole 24 is automatically grinded and polished to further improve the surface finish of the inner surface of the port hole 24. Step 804 may be performed by the aforementioned CNC milling machine 26 or a different grinding and polishing means. In some embodiments, step 804 may be omitted where step 802 provides a satisfactory surface finish for analyzing the weld joint 20.

At step 806, a portion of the inner surface the port hole 24 is etched to increase contrast between a weld joint 20 and a base metal so that weld dimensions can be measured. In the exemplary embodiment, the etching process involves soaking a cotton swab 28 in Nital (a mixture of ethanol and nitric acid) and applying the Nital in a localized portion of the inner surface of the port hole 24. In other words, the Nital is not applied to the entire inner surface of the port hole 24. The use of the cotton swab 28 has been found to minimize the amount of Nital necessary to sufficiently etch the weld joint 20.

At step 808, a probe 30 of a portable microscope 32 is inserted into the port hole 24, and one or more images of the inner surface of the port hole 24 is/are captured for analysis. In the exemplary embodiment, the probe 30 includes a mirror 34 which is angled at a forty-five degree (45°) angle relative to a lens of the microscope 32 and faces an opening in the probe 30. In operation, the opening in the probe 30 is pointed at the portions of the inner surface of the port hole 24 to be analyzed. The mirror 34 reflects an image of the inner surface of the port hole 24 by ninety degrees (90°) to the microscope 32, thereby allowing to take an image of a weld section through a small port hole 24 that is smaller than a size of the microscope 32 when imaging the weld joint 20. The mirror allows the lens of the microscope 32 to remain parallel to the welded surface of the part 22. In some embodiments, the microscope 32 is linked with a computer 40 via an USB cable. The computer 40 may display images 42, provided from the microscope 32. The computer 40 may provide a live video feed of the images from the microscope 32. Alternatively or additionally, still images may be displayed. Other wired or wireless data transmission means may be employed to transmit the images from the microscope 32 to any device which will allow a user to analyze the images, e.g., a computer, a tablet, etc. In some embodiments, the images 42, which may include video and/or still images, may be stored for future use. At step 810, measurement is taken of the weld joint 20 using one or more of the images. At step 812, the results of the analysis are reported. In the exemplary embodiment, the probe 30 is made through a 3D printing operation. However, other manufacturing means may alternately be employed.

The entire process discussed above takes substantially less time and resources than other known destructive weld analysis procedures with no drawbacks. This may significantly reduce the amount of parts that must be held by a part manufacturer prior to shipping those parts to a customer, thereby providing savings to the part manufacturer.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A method of testing a weld joint, comprising:
preparing a part that includes at least one weld joint which joins at least two metal components with one another;

machining at least one port hole in the at least one weld joint;
inserting, into the at least one port hole, a probe that includes a mirror attached to a camera; and
reflecting an image of the weld joint off of the mirror and to the camera while the probe is inserted into the at least one port hole.

2. The method as set forth in claim 1, further including etching an inner surface of the at least one port hole prior to inserting the probe into the at least one port hole.

3. The method as set forth in claim 2, wherein etching the inner surface of the at least one port hole includes applying a mixture of ethanol and nitric acid to the inner surface.

4. The method as set forth in claim 3, wherein the mixture of ethanol and nitric acid is applied to the inner surface of the at least one port hole using a cotton swab.

5. The method as set forth in claim 3, wherein the mixture of ethanol and nitric acid is applied to only a portion of the inner surface of the at least one port hole.

6. The method as set forth in claim 1, wherein machining the at least one port hole in the at least one weld joint involves using a first tool to initially form the at least one port hole and using a second tool to perform a finishing pass around the at least one port hole to improve a surface finish of an inner surface of the port hole.

7. The method as set forth in claim 1, wherein the machining the at least one port hole in the at least one weld joint is using a computer numerical control (CNC) milling machine.

8. The method as set forth in claim 7, wherein the machining at least one port hole in the at least one weld joint further includes machining a plurality of port holes into a plurality of weld joints.

9. The method as set forth in claim 1, wherein the probe has a sidewall with an opening and wherein the mirror faces the opening and is angled relative to the camera such that, in use, the image enters the probe through the opening and is reflected off the mirror towards the camera.

10. A method of analyzing a weld joint, comprising:
machining a port hole in the weld joint;
etching the weld joint;
inserting a probe into the port hole, the probe including a mirror;
reflecting an image of the weld joint off of the mirror towards a camera;
capturing the image with the camera; and
analyzing the weld joint using the image captured by the camera.

11. The method as set forth in claim 10, wherein etching the weld joint includes applying a mixture of ethanol and nitric acid to the weld joint that is exposed at the port hole.

12. The method as set forth in claim 10, wherein etching the weld joint includes etching at least a portion of an inner surface of the port hole.

13. The method as set forth in claim 12, wherein the at least a portion of the inner surface of the port hole includes an entirety of the inner surface of the port hole.

14. The method as set forth in claim 12, wherein the etching the inner surface of the port hole includes applying a mixture of ethanol and nitric acid to the inner surface.

15. The method as set forth in claim 14, wherein the mixture of ethanol and nitric acid is applied to the inner surface of the port hole using a cotton swab.

16. The method as set forth in claim 14, wherein the mixture of ethanol and nitric acid is applied to only a portion of the inner surface of the port hole.

17. The method as set forth in claim 10, wherein machining the port hole in the weld joint further includes machining a plurality of port holes into a plurality of weld joints.

18. The method as set forth in claim 10, wherein the machining the port hole in the weld joint further includes machining the port hole using a computer numerical control (CNC) milling machine.

19. The method as set forth in claim 10, wherein the machining the port hole in the weld joint includes using a first tool to initially form the port hole and using a second tool to perform a finishing pass around the port hole to improve a surface finish of an inner surface of the port hole.

20. The method as set forth in claim 10, wherein the probe has a sidewall with an opening and wherein the mirror faces the opening and is angled relative to the camera such that, in use, the image enters the probe through the opening and is reflected off the mirror towards the camera.

\* \* \* \* \*

6